United States Patent
Alba et al.

(10) Patent No.: US 9,104,749 B2
(45) Date of Patent: Aug. 11, 2015

(54) SEMANTICALLY AGGREGATED INDEX IN AN INDEXER-AGNOSTIC INDEX BUILDING SYSTEM

(75) Inventors: Alfredo Alba, Morgan Hill, CA (US); Chad E DeLuca, San Jose, CA (US); Vuk Ercegovac, Campbell, CA (US); Thomas D Griffin, Campbell, CA (US); Jun Rao, San Jose, CA (US); Asim V Singh, San Jose, CA (US); Kevin B Wang, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 13/005,425

(22) Filed: Jan. 12, 2011

(65) Prior Publication Data

US 2012/0179684 A1    Jul. 12, 2012

(51) Int. Cl.
*G06F 17/30*    (2006.01)

(52) U.S. Cl.
CPC ...... *G06F 17/30631* (2013.01); *G06F 17/3071* (2013.01); *G06F 17/30235* (2013.01)

(58) Field of Classification Search
CPC .................. G06F 17/30235; G06F 17/30631; G06F 17/3071
See application file for complete search history.

(56) References Cited

U.S. PATENT DOCUMENTS

| | | | |
|---|---|---|---|
| 7,143,046 B2 | 11/2006 | Babu et al. | |
| 7,219,099 B2 | 5/2007 | Kuntala et al. | |
| 7,349,919 B2 | 3/2008 | Russell et al. | |
| 7,640,267 B2 | 12/2009 | Spivack et al. | |
| 2002/0194159 A1 | 12/2002 | Kamath et al. | |
| 2004/0220944 A1 | 11/2004 | Behrens et al. | |
| 2007/0219773 A1* | 9/2007 | Roux et al. | 704/1 |
| 2009/0063473 A1* | 3/2009 | Van Den Berg et al. | 707/5 |
| 2009/0276403 A1 | 11/2009 | Tamayo et al. | |
| 2011/0087668 A1* | 4/2011 | Thomas et al. | 707/738 |

OTHER PUBLICATIONS

Yu et al. "SNet: Skip Graph Based Semantic Web Series Discovery," Proceedings of the 2007 ACM Symposium on Applied Computing, (2007), 5 pages.

Zhuge et al. "A Scalable P2P Platform for the Knowledge Grid," IEEE Transactions on Knowledge and Data Engineering, (Dec. 2005), vol. 17, Issue 12, 25 pages.

Bonino et al. "Automatic Learning of Test-to-Concept Mappings Exploiting WordNet-like Lexical Networks," 2005 ACM Symposium on Applied Computing, (2005), pp. 1639-1644.

Castano et al. "Conceptual Schema Analysis: Techniques and Applications." ACM Transactions on Database Systems, (Sep. 1998), vol. 23, Issue 3, pp. 286-332.

* cited by examiner

*Primary Examiner* — Anteneh Girma
(74) *Attorney, Agent, or Firm* — Jeffrey T. Holman

(57) ABSTRACT

A computer program product for an indexer-agnostic index building system includes a computer readable storage medium to store a computer readable program, wherein the computer readable program, when executed on a computer, causes the computer to perform operations for creating a semantically aggregated index. The operations include: extracting documents from a data source, wherein each document includes a data object; distributing the documents to a plurality of processing nodes within the system; for each node: indexing the data objects for each document into fields using semantic rules; and grouping indexed data objects for related fields by: classifying the documents into logical groups based on the semantic rules; and creating a searchable index shard for related logical groups.

14 Claims, 5 Drawing Sheets

SEMANTICALLY AGGREGATED INDEX IN AN INDEXER-AGNOSTIC INDEX BUILDING SYSTEM

BACKGROUND

Index build technologies are generally optimized for even distribution of data across index shards. While conventional distributed indices are powerful, they also disaggregate the semantics of the data itself under an assumption that the data is homogeneous. Under some circumstances, such as in a general text search problem, the assumption that the data is homogeneous is good. In other circumstances, such as when specific data collections are needed, the assumption is not useful. Providing a search engine for a specific data collection may include either creating collection-specific indices or developing complex aggregation and filtering data joiners along with complex queries, while relying on intrinsically-generated, structured metadata.

Search engines or databases that deal with specific data collections often use a searchable index that includes a compilation of documents or other data for the purposes of the particular search engine. The size and content of the search index depends on the purposes of the search engine. For example, a search engine for patents may search repositories of all issued patents and published patent applications for a particular patent system—for example, for the United States Patent and Trademark Office or for the patent office of another country, or both. In order to create the patent search engine, a searchable index including all issued patents and published applications for the particular system can be built. Building large searchable indexes is a time-consuming process and may require a large amount of computer processing power.

SUMMARY

Embodiments of a system are described. In one embodiment, the system is an indexer-agnostic index building system. The system includes a plurality of processing nodes connected to a computer readable storage medium, and a processor configured to perform operations. The operations include: extracting documents from a data source, each document including a data object; distributing the documents to a plurality of processing nodes within the system; for each node: indexing the data objects for each document into fields using semantic rules; and grouping indexed data objects for related fields by: classifying the documents into logical groups based on the semantic rules; and creating a searchable index shard for related logical groups. Other embodiments of the system are also described.

Embodiments of a computer program product are also described. In one embodiment, the computer program product is a computer program product for an indexer-agnostic index building system, including a computer readable storage medium to store a computer readable program, wherein the computer readable program, when executed on a computer, causes the computer to perform operations for creating a semantically aggregated index. The operations include: extracting documents from a data source, each document including a data object; distributing the documents to a plurality of processing nodes within the system; for each node: indexing the data objects for each document into fields using semantic rules; and grouping indexed data objects for related fields by: classifying the documents into logical groups based on the semantic rules; and creating a searchable index shard for related logical groups. Other embodiments of the computer program product are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
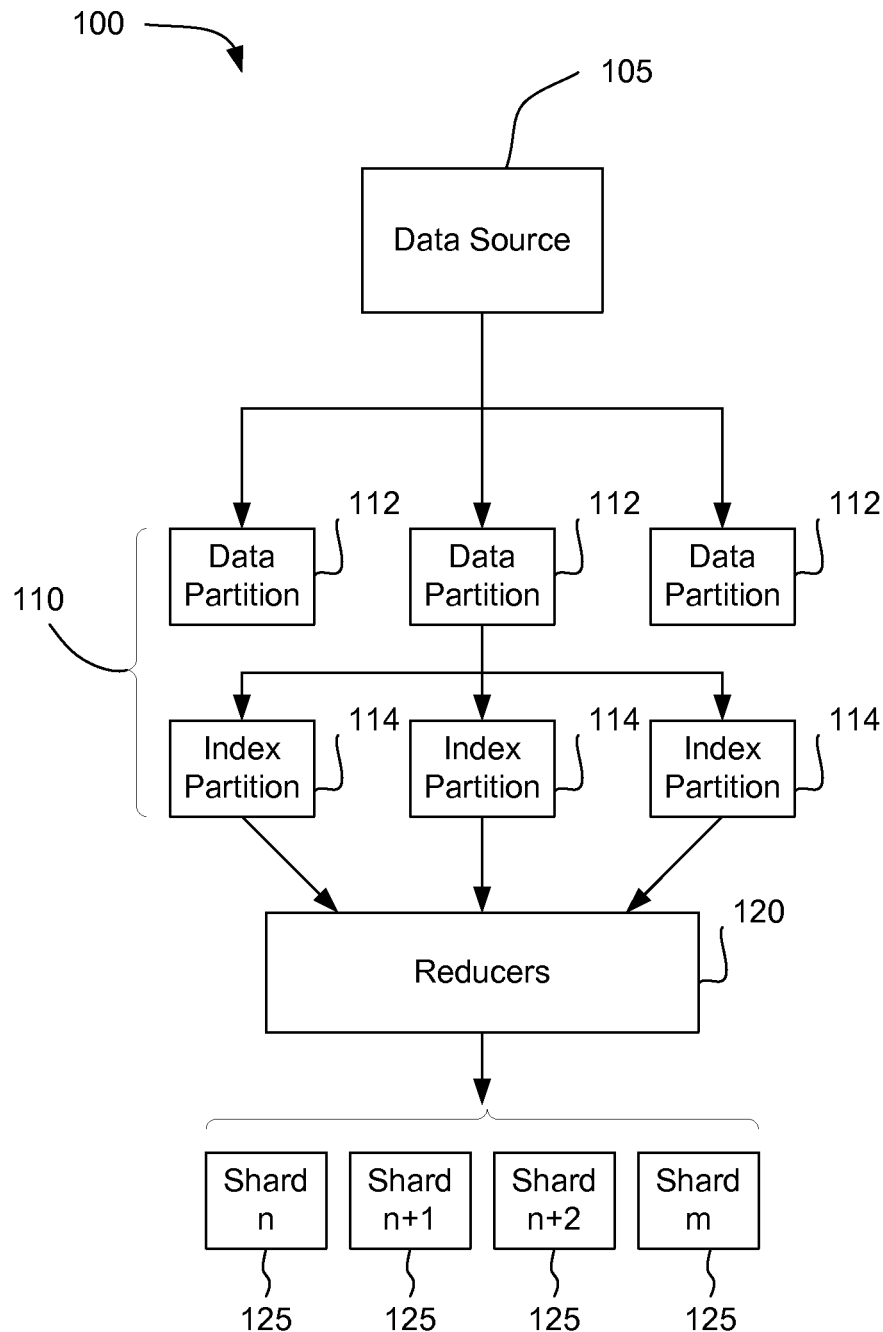
FIG. 1 depicts a schematic diagram of one embodiment of an index building system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a method for creating a semantically aggregated index in an indexer-agnostic index building system. Embodiments of the method as described herein create searchable index shards 125 for semantically related data in a group of documents. More specifically, the method indexes data objects from the documents into fields using semantic rules, grouping related fields of data objects together, and classifying the documents into logical groups based on the semantic rules before creating an index shard for related logical groups.

There may be a mismatch between how data is queried and how it is stored in data sources in conventional searchable indices. Data stored in particularized data sources may have specific indexing techniques that are typically very close to the data structure, whereas the information in generalized data sources is organized based on interest domain—what the information of interest looks like—and what it intends to model or represent. Based on information acquired from the data source, an index or collection of indices can be created based on the semantics contained within the data source itself.

Conventional index building technologies generally build indices under an assumption that the data is homogeneous, and disaggregate the semantics of the data itself rather than aggregating the semantics. Conventional searchable indices that search each full text body of documents are generally global searches that include all documents, whether relevant or not, that are not sufficiently focused to provide a comprehensive set of relevant results for a specific search. Additionally, many such searchable indices may return results based on a statistical analysis of the results for a particular search in order to return the most relevant hits within a reasonable amount of time, so some relevant documents may be left out. An index based on the semantics contained within the data source itself may be useful in creating indices that are more efficient and comprehensive for user queries as well as more efficient in relation to index build times.

User queries may be optimized by quickly focusing on the data that is semantically relevant to a current query. An index produced around taxonomies or ontologies of concepts and terms out of specific domains of interest allows search operations to be exhaustive as to the relevant search parameters, rather than across an entire corpus of disassociated documents. The method described herein does not prevent a corpus-wide search from being used, nor does it prevent traditional result rankings from being applied. Rather, the method enhances the index building system's ability to construct shards capable of leveraging the semantics contained within the query itself.

As used herein and in the appended claims, the terms "shard" and "index shard" refer generally to a grouped set of data/documents used in a searchable index. A searchable index may include one or more shards, depending on the intended use and content of the index.

FIG. 1 depicts a schematic diagram of one embodiment of an index building system 100. In one embodiment, the indexer-agnostic index building system 100 may implement the method and system described herein using distributed computing software to support distributed computing such as MapReduce. Other embodiments may use other distributed computing software. A distributed computing system includes multiple computing devices or processing nodes 110 that interact with each other in order to accomplish a shared goal. For example, the distributed computing system may be used to process a large amount of data, such as a large set of documents for a search index. By dividing the processing responsibilities among multiple processing nodes 110 in parallel, the index building system 100 may be able to process the data faster than if the data is processed sequentially.

In one embodiment of a distributed computing system using MapReduce software, the index building system 100 includes a plurality of processing nodes 110 as shown in FIG. 1. The index building system 100 may include several "mappers" (shown in FIG. 3) at the processing nodes 110 that retrieve data from the data source. Each processing node 110 includes a mapper configured to process the documents in parallel with each of the other mappers. Other distributed computing software may perform similar operations as those described herein.

Figure 2:
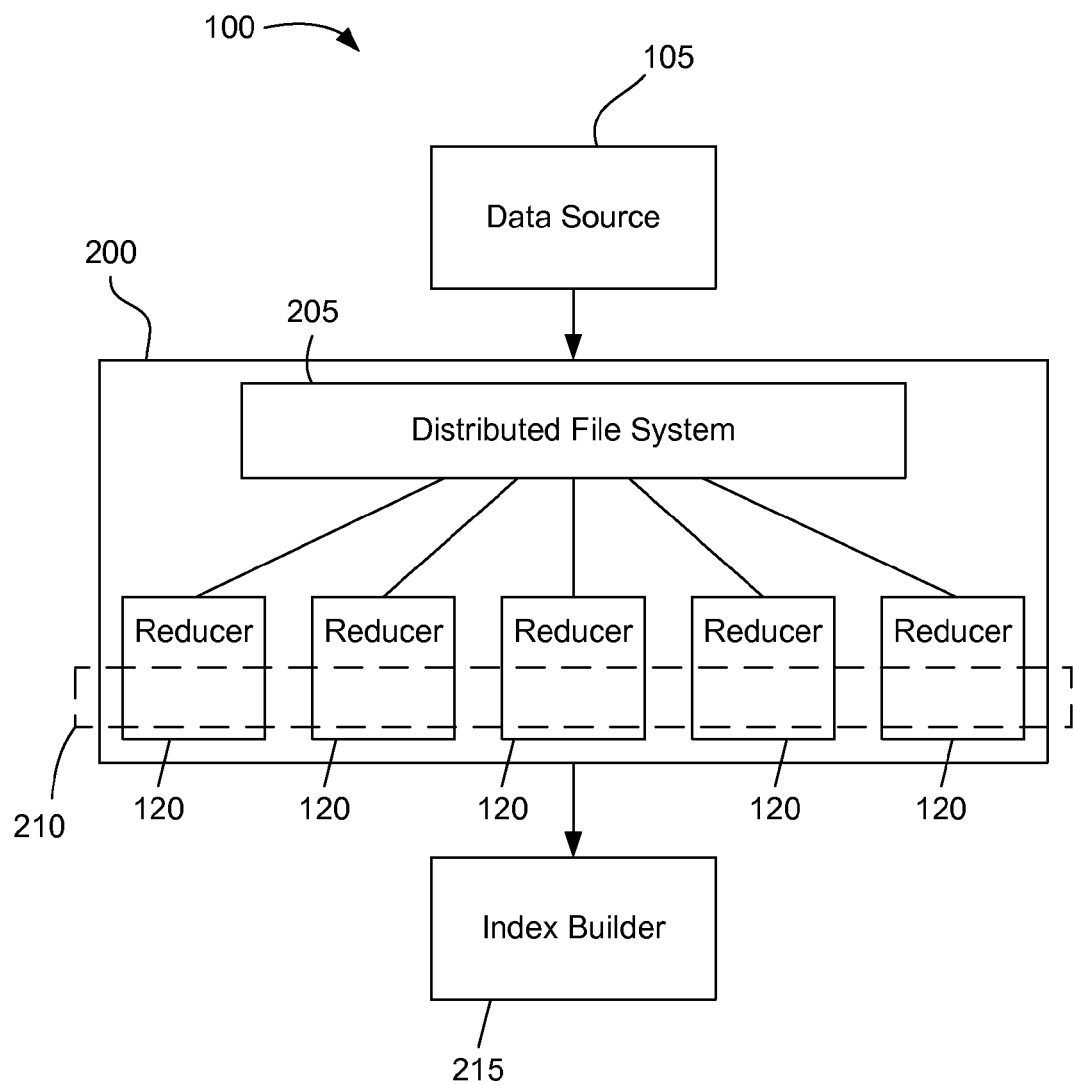
FIG. 2 depicts a schematic diagram of one embodiment of the index building system of FIG. 1 having a distributed platform stack.

Distributed computing software may be used with the method described herein to index a set of documents in preparation for the creation of an index shard 125. All documents to be searched are first retrieved from a data source 105. The index building system 100 may include an initial computing device configured to retrieve the documents and determine the distribution of the documents among the processing nodes 110. The initial computing device may be included in a distributed platform stack, as shown in FIG. 2. A configuration file may indicate which documents are to be retrieved and/or from which data source 105 the index building system 100 is to retrieve the documents. The data source 105 may be an arbitrary data source 105 including one or more data storage devices. The initial computing device may include a data storage medium such that the documents are stored locally in preparation for indexing. In some embodiments, the data storage medium is also used for storing information about, or including, the documents after the documents have been indexed or after the index shard 125 has been created. In one embodiment, the nodes 110 themselves include separate partitions 112, 114. A data partition 112 may be for storing data at the nodes 110 and an index partition 114 may be for indexing the data separately from the data partitions 112. Each node 110 may include one or more data partitions 112 or index partitions 114, each partition being separate from other partitions.

After the documents are retrieved, the index building system 100 distributes the documents among a plurality of processing nodes 110 in the index building system 100. The processing nodes 110 may be computer processing units associated with individual computing devices, each having a data storage device, memory, input/output devices, or other components. Alternatively, some of the processing nodes 110 may be grouped together in a computing device having multiple processing units.

In one embodiment, the index building system 100 distributes the documents among the processing nodes 110 for a generally balanced load for each node 110. Balancing the document processing load across the processing nodes 110 helps maximize processing capabilities of the index building system 100, and helps reduce the amount of time spent indexing the documents. Additionally, each processing node 110 may perform specialized indexing or other tasks on a set of documents.

To index the documents, the processing nodes 110 process data objects within the documents by separating the data objects in each of the documents into fields. In one embodiment, a data object includes a full text body of the document 308, including all structured and unstructured sections of the text body. In one embodiment, structured sections include the document title, authors, publication dates, journal dates, journal volumes, and possibly others, and unstructured sections include a document abstract, introduction, conclusion, summary, main description body, or any text or field that may be included in the document that is not specifically structured for an index or other purpose. While the structured and unstructured sections may be identified as above, the sections may be identified in any manner according to a specific document or group of documents. Data objects may include all structured or all unstructured data, and other combinations or types of structured or unstructured sections may exist other than those enumerated herein. In other embodiments, data objects include images, audio, video, and/or metadata relating to the document.

The data objects are broken up into the various sections and indexed by field (title, author, abstract, introduction, etc.). In one embodiment, the indexing process uses semantic rules when indexing the data objects into fields. The semantic rules allow the index building system 100 to separate the documents according to the content of a particular field in each document. In one embodiment of the index building system 100, the index building system 100 receives a set of patents and applications from the data source 105. After the index building system 100 identifies the separate sections of the patent document 308, the index building system 100 applies a set of semantic rules to the indexing process. The semantic rules may include a rule to separate patents and applications according to their technology classification. Accordingly, the index building system 100 determines the technology classification(s) of each document and indexes the documents based on that determination. The semantic rules may be established prior to indexing the documents and according to a purpose of the index. Giving additional emphasis to the semantic rules during the indexing process enables a consistent classification of the data objects. Additional rules may also be used to help index the documents.

Each field of data objects may be indexed for a specified index shard 125. For example, in the example above, the index building system 100 indexes the documents and builds shards 125 containing those documents by technology classification. The index building system 100 receives the documents from the data source 105 and distributes the documents to the processing nodes 110. The processing nodes 110 receive the documents and identify the data objects within the documents corresponding to a particular classification. Each mapper builds a portion of each index shard 125 as it processes the information for the documents, such that there is an index shard 125 for each classification. By having each mapper process a fragment of every shard 125, the indexing and building time for a particular shard 125 fragment may be reduced. Reducers 120 take each shard fragment and consolidate the fragments into shards 125. As many or as few shards 125 may be created, according to the index requirements or user query requirements. The reducers 120 and shard consolidation process are described in more detail below.

FIG. 2 depicts a schematic diagram of one embodiment of the index building system 100 of FIG. 1 having a distributed platform stack 200. After the index building system 100 has retrieved and indexed the documents into fields, a reducer 120 pulls each fragment of a shard 125 from the mappers and consolidates the shard fragments into an index shard 125. The index building system 100 may have a reducer 120 for each shard 125 that the index building system 100 is instructed to build. For example, if the index building system 100 is instructed to build one hundred shards 125 for a particular index, the system 100 will use one hundred reducers 120 to combine the fragments into one hundred shards 125. In one embodiment, the reducers 120 are part of a distributed platform stack 200 including a distributed file system 205. The distributed file system 205 includes the processing nodes 110 where the mappers are located. Each of the reducers 120 may be associated with a different computer resource, or there may be more than one reducer 120 associated with a single computer resource. In some embodiments, the number of reducers 120 is managed dynamically by the index building system 100 according to the number of shards 125 to be built. A distributed engine 210 may determine how many reducers 120 are needed to create a specified index.

The indexed documents are combined together by the reducers 120 into shards 125 in a semantically organized manner to maintain the semantic divisions created when indexing the documents according to the semantic rules. The documents are semantically classified into logical groups based on the defined rules. The semantic rules by which the shards 125 are combined are the same rules that the index building system 100 uses to index the data objects. The rules may be as simple as separating the documents by country of origin, language, or topic, among others, or as complex as an interrelation between the documents' metadata. The semantic rules may be any number or type of rules—including others not enumerated herein—depending on the purposes for which the index is being created.

After the indexed documents are combined based on the logical groups, related logical groups are combined to build an index shard 125 or set of index shards 125. An index builder 215 then combines the created shards 125 into a full searchable index. The index may be a particularized index that includes many interrelated shards 125 according to a particular user query or set of user queries. The index may alternatively include non-related shards 125 and constructed as a more generalized index. Conventional indices using index shards 125 construct evenly distributed shards 125, such that each shard 125 is of equal size and does not have an organization based on document semantics. Conversely, because semantic index shards 125 are based on document semantics, the index shards 125 may be different sizes and have an organization related to the document semantics.

A single document may be indexed into more than one shard fragment, depending on the indexing rules defined by the index shards 125 to be built. For example, if the index building system 100 is instructed to build a searchable patent index, the index may include all granted patents and patent applications for the United States Patent and Trademark Office (USPTO), the European Patent Organisation (EPO), and any countries participating in the Patent Cooperation Treaty (PCT). The index building system 100 may build different shards 125 for each of the patent organizations (USPTO, EPO, and others), and may build two shards 125 for the USPTO—one for all granted patents and one for all patent applications. The index building system 100 may be further instructed to build a shard 125 that includes only patents or applications referenced by other patents. When indexing the patents into the separate shards 125, patents and applications for the USPTO that are referenced by other patents/applications will be indexed into both the shard 125 for the corresponding USPTO patent or application shard 125 and the shard 125 for referenced patents and applications. Index building systems 100 may have many shards 125 with overlapping content. Consequently, each of the index shards 125 built by the index building system 100 will be fully comprehensive, providing for comprehensive results to a user query.

Indexing the documents as described herein and grouping the documents into shards 125 based on the logical groups of semantically related data objects may reduce build time for the index by as much as 60-70% over conventionally constructed indices. Grouping the shards 125 according to the semantic rules may also help reduce the search time for user queries. Much of the full index may be disregarded before the full search takes place. The index determines which shards 125 relate to the semantics of the user's query and then disregards all shards 125 that do not relate to the query, such that only a portion of the index is actually searched. Additionally, the index building system 100 is indexer-agnostic or indexer-neutral, such that the system 100 may use any indexing system to index the documents into fields and accomplish the shard building method described herein.

Figure 3:
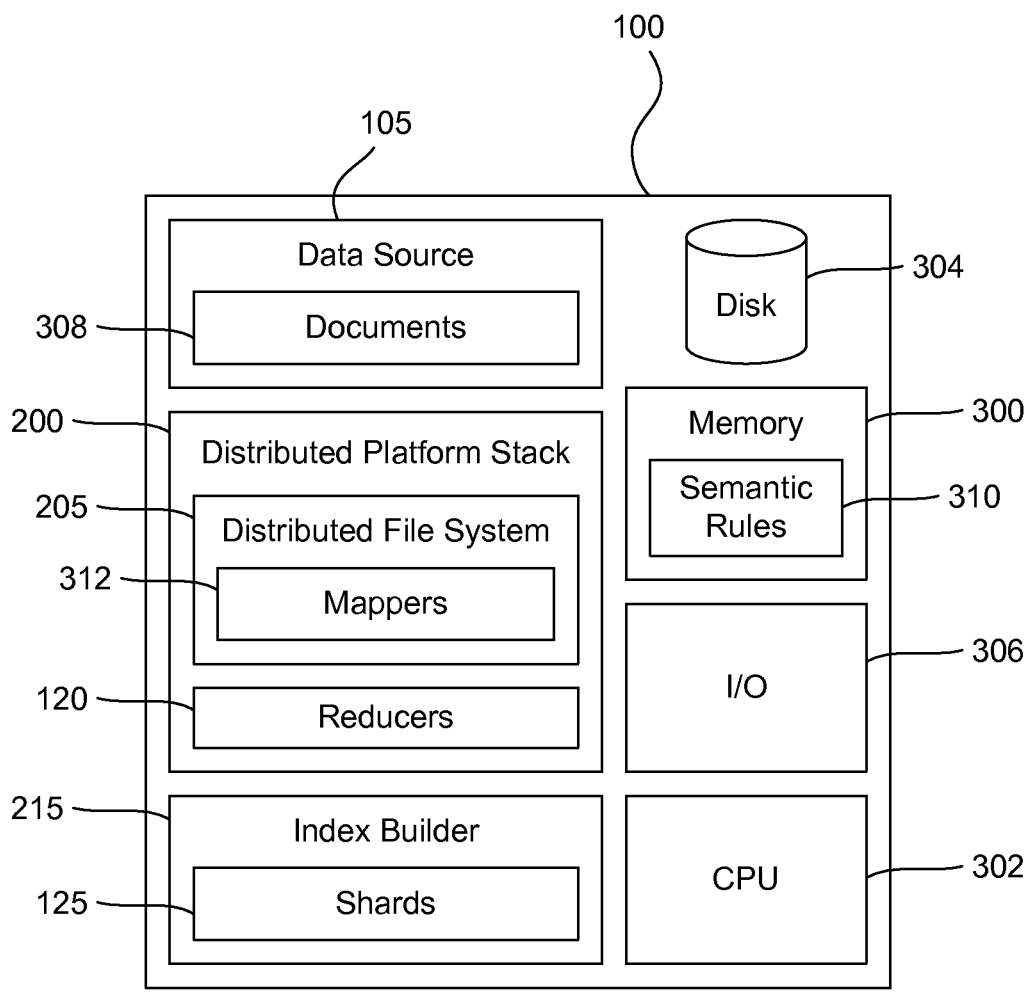
FIG. 3 depicts a schematic diagram of one embodiment of the index building system of FIG. 1.

FIG. 3 depicts a schematic diagram of one embodiment of the index building system 100 of FIG. 1. The depicted index building system 100 includes various components, described in more detail below, that are capable of performing the functions and operations described herein. In one embodiment, at least some of the components of the index building system 100 are implemented on a computer system. For example, the functionality of one or more components of the index building system 100 may be implemented by computer program instructions stored on a computer memory device 300 and executed by a processing device 302 such as a central processing unit (CPU). The index building system 100 may include other components, such as a disk storage drive 304 or other computer readable storage medium, input/output devices 306, a data source 105, an index builder 215, and a distributed platform stack 200. In one embodiment, the data source 105 is an arbitrary data source 105. The data source stores documents 308 to be indexed and may include several storage devices and may be part of a third-party system. In one embodiment, the memory device 300 stores semantic rules 310 on which the index is to be based.

The distributed platform stack 200 may perform functions for the index building method described herein, and may maintain and store data used by the index building system 100. The distributed platform stack 200 may include a distributed file system 205 having a plurality of mappers 312 that may be distributed across multiple processing nodes 110 The distributed platform stack 200 may also include reducers 120. In one embodiment, the number of reducers 120 used by the index building system 100 is determined by the number of shards 125 to be created by the system 100. Some embodiments of the system 100 may use a single computing device to host all of the reducers 120, while other embodiments may distribute the reducers 120 across multiple computing devices. The index builder 215 is used to combine all the shards 125 that have been created by the distributed platform stack 200 into a searchable index.

Figure 4:
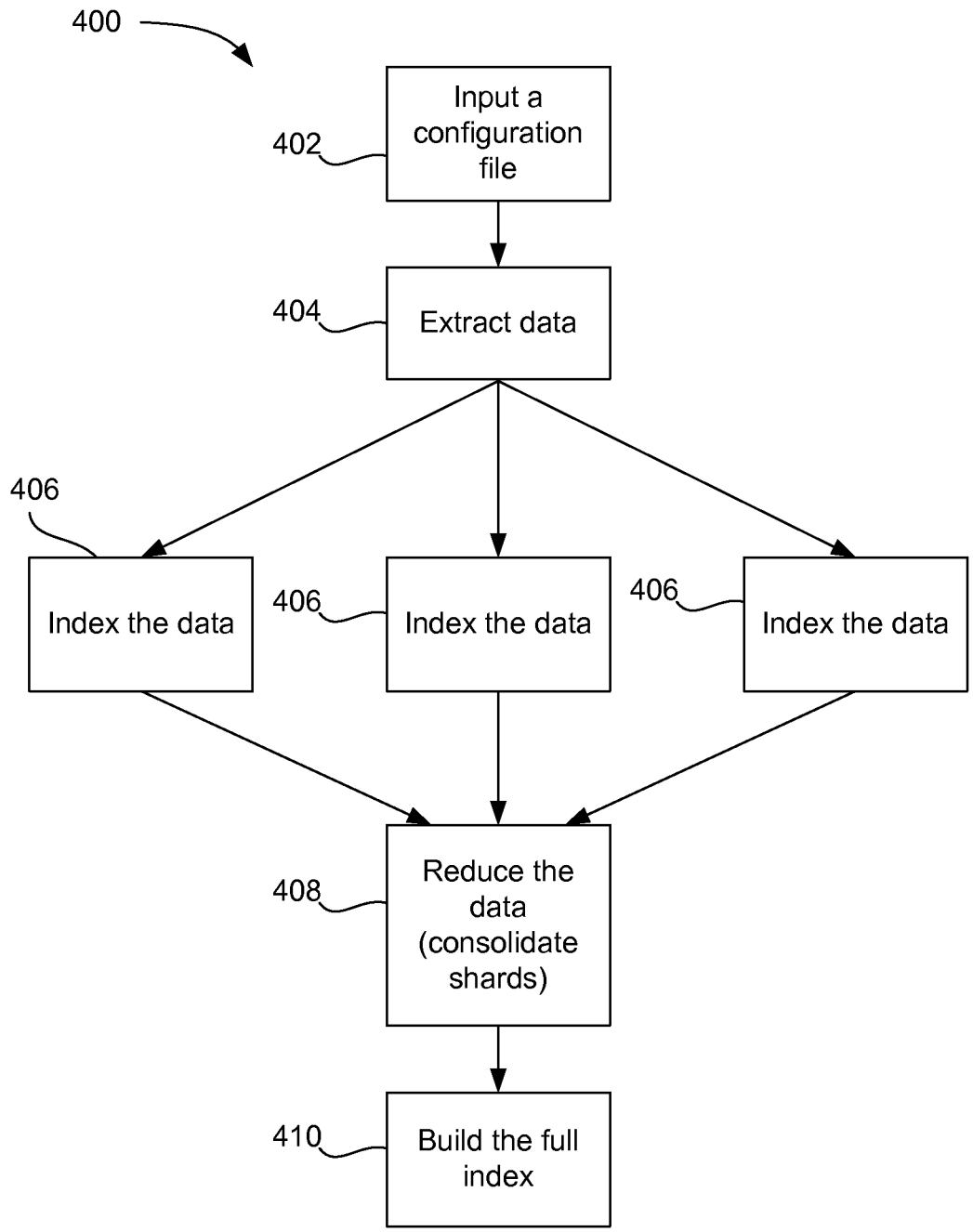
FIG. 4 depicts a flowchart diagram of on embodiment of a distributed index building method.

FIG. 4 depicts a flowchart diagram of one embodiment of a distributed index building method 400. A configuration file is input 402 into the index building system 100 that indicates which documents 308 or data to extract from the data source 105 and where the data are located at the data source 105. The index building system 100 then extracts 404 the data from the data source 105 and distributes the data among a plurality of nodes 110, where each node 110 indexes 406 the data. The data is indexed 406 into fields according to a predetermined set of rules, which may include semantic rules 310.

The indexed data is then combined back together and the reducers 120 reduce 408 the data into logical groups (or consolidate the data into shards 125 based on the fragments of indexed data received from the nodes 110). Once all shards 125 are created with all of the data relevant to each shard 125, the index building system 100 builds 410 the index to allow the index to be searched by a user. The index building method is described in more detail below for FIG. 5.

In one embodiment, the method 400 uses distributed computing software to index and group the data into shards. Other embodiments of the method 400 may use other software or processes for distributing and combining the data using the semantic rules 310.

Figure 5:
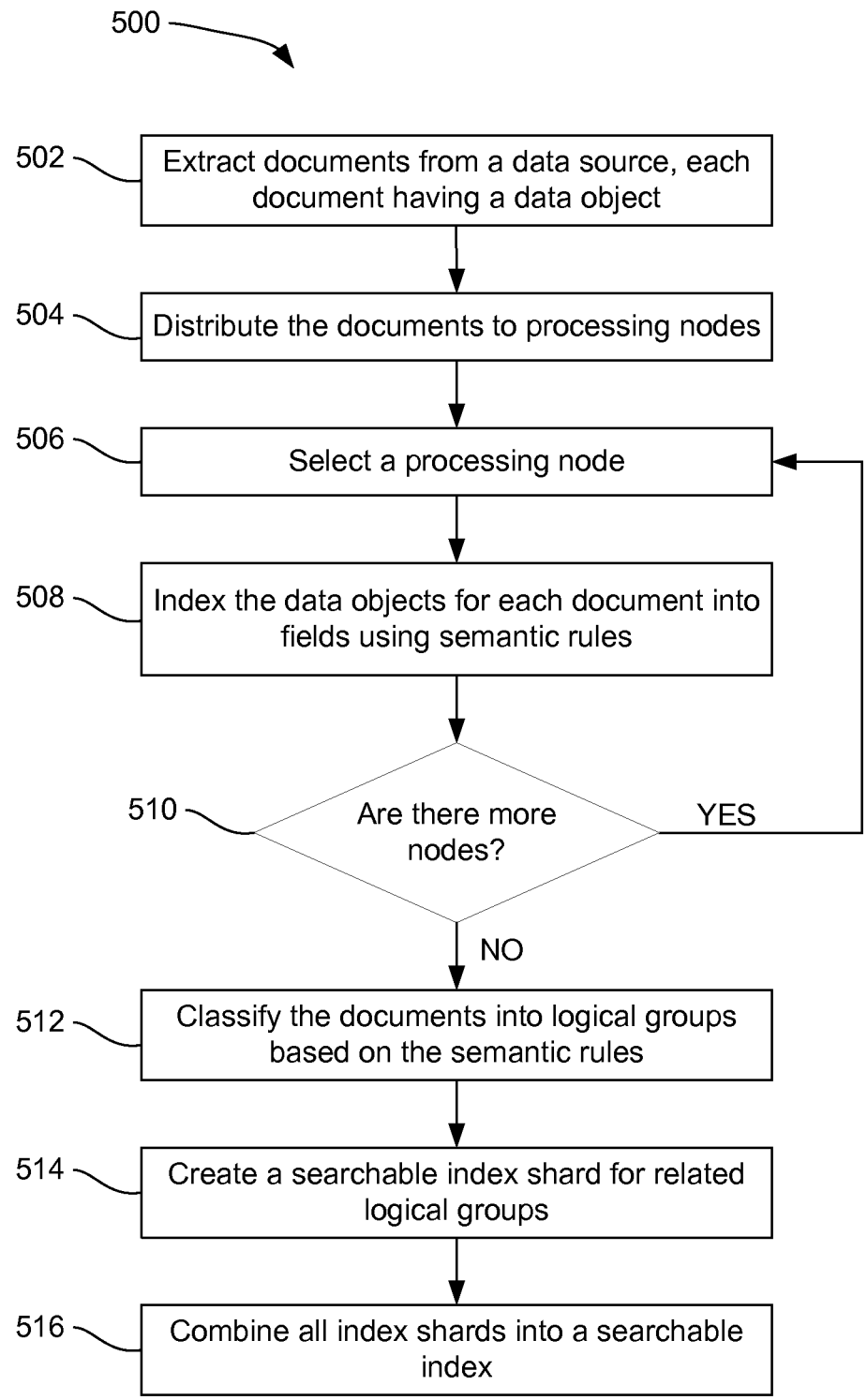
FIG. 5 depicts a flowchart of one embodiment of a method for creating a semantically aggregated index in an index-agnostic index building system.

FIG. 5 depicts a flowchart of one embodiment of a method 500 for creating a semantically aggregated index in an index-agnostic index building system 100. Although the method is described in conjunction with the index building system 100 of FIG. 1, embodiments of the method may be implemented with other types of index building systems.

In one embodiment, the index building system 100 extracts 502 documents 308 from a data source 105, each data having a data object. The data source 105 may be an arbitrary data source 105, such that the data source 105 may be any type of data source 105. The specific nature of the data source 105 is irrelevant to the operation of the index building system 100. The documents 308 may be stored at a local storage medium within a distributed file system 205 to improve processing of the documents 308. The documents 308 are then distributed 504 to a plurality of processing nodes 110 within the distributed file system 205. The processing nodes 110 may each be associated with a different computing device, or some or all of the nodes 110 could be associated with a single computing device. In one embodiment, the distributed file system 205 distributes the documents 308 such that there is a generally balanced load across all nodes 110 which may help reduce processing time at the nodes 110.

In one embodiment, the index building system 100 selects 506 a processing node 110 and indexes 508 the data objects for each document 308 into fields using semantic rules 310. The index building system 100 checks 510 if there are more nodes 110 having documents 308 that need to be indexed. If there are more nodes 110, the index building system 100 continues selecting 506 processing nodes 110 until there are no more nodes 110 In one embodiment, the nodes 110 are selected 506 such that the nodes 110 are able to index the documents 308 in parallel or simultaneously.

In one embodiment, the nodes 110 index 508 the full text of each document 308 so that all of the text will be searchable in the final index. The documents 308 may include structured and/or unstructured data. In one embodiment, the fields into which the nodes 110 index the documents 308 include the document title, author, abstract, introduction, conclusion, year of publication, and any other relevant data within the document 308 that may be useful to a user in identifying, reading, or distinguishing the documents 308 within the searchable index. The nodes 110 may also use headers within the main body of the document text to help index the document 308. In one embodiment, the nodes 110 include metadata for each document 308 when indexing the document 308.

The index building system 100 then groups the indexed data objects for related fields. The system 100 first classifies 512 the documents 308 into logical groups based on the provided semantic rules 310. The semantic rules 310 may include any number or type of semantic rule that allows the system 100 to distinguish each document 308 with the given data objects. Some examples include classifying the documents 308 by country of origin, topic, year of publication, and others. In one embodiment, the rules include an interrelation between the metadata in the documents 308. Rules may be applied to the index building system 100 according to specific user-specified semantic rules or for a general index.

After the documents 308 are classified 512 based on the semantic rules 310, the index building system 100 then creates 514 a searchable index shard 125 for related logical groups. In one embodiment, each logical group of documents 308 is used to create a single index shard 125. For example, if a semantic rule was used to classify the documents 308 for a given journal by year of publication, a single shard 125 may include only documents 308 classified for a particular year of publication. Consequently, if the journal has documents 308 published over a period 30 years, the index building system 100 will create 30 shards—one for every year of publication. Other embodiments may group the documents 308 by periods of several years or using rules other than or in addition to year of publication. In some embodiments, a single document 308 may be classified into several logical groups and thus be included in multiple shards 125.

The index building system 100 then combines 516 all of the created index shards 125 into a searchable index. Because the index includes shards 125 of documents 308 grouped according to semantic rules 310, the index may disregard much of the data during a user query by ignoring the shards 125 that do not relate to the specific semantics of the user query. This provides a comparable level of accuracy as searching the entire index, with only a subset of the indexed data having actually been searched. Because conventional indices do not group the documents 308 semantically, conventional indices generally must search through all of the documents 308 in order to find which documents 308 are relevant to the user's query.

An embodiment of an indexer-agnostic index building system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including operations for creating a semantically aggregated index in an indexer-agnostic index building system 100 as described herein.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. As a specific example, a computer readable medium is a physical piece of hardware capable of storing at least a portion of the program.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Because the index building system 100 is indexer-agnostic, any number of different indexers may be used. Different indexing applications may provide different or additional functionality or other advantages over one another, so the ability to use the same process to build a semantic index in a distributed fashion with different indexers may be beneficial. The design of the indexer-agnostic system 100 allows the system 100 to be leveraged to test the performance of competing indexers.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product for an indexer-agnostic index building system, comprising:
    a non-transitory computer readable storage medium to store a computer readable program, wherein the computer readable program, when executed on a computer, causes the computer to perform operations for creating a semantically aggregated index, the operations comprising:
        extracting documents from a data source, wherein each document includes a data object;
        distributing the documents to a plurality of processing nodes within the system, wherein distributing the documents to a plurality of nodes comprises distributing the documents to a mapper at each processing node;

for each of the plurality of processing nodes, creating a shard fragment by indexing the data objects for each document into fields using semantic rules for identifying related data objects between the documents; and grouping indexed data objects for related fields by:

grouping the related documents into one of a plurality of logical groups based on the semantic rules; and creating a full searchable index by:

consolidating shard fragments from the plurality of processing nodes into index shards for each of the plurality of logical groups; and combining the index shards into the full searchable index shard.

2. The computer program product of claim 1, wherein a distribution load of the documents is approximately balanced among the processing nodes after distributing the documents.

3. The computer program product of claim 1, wherein the data objects comprise a full text of the document.

4. The computer program product of claim 1, wherein the semantic rules comprise a rule based on at least one of the group consisting of: country of origin, language, topic, and metadata for the data objects in the document.

5. The computer program product of claim 1, wherein each processing node contributes a portion of the index shard.

6. The computer program product of claim 1, wherein the operations are implemented using distributed computing software, wherein distributing the documents to a plurality of nodes comprises distributing the documents to a mapper at each processing node, and grouping the indexed data objects comprises grouping the data objects at a reducer for each index shard created by the system.

7. The computer program product of claim 1, wherein the computer program product, when executed on the computer, causes the computer to perform additional operations, comprising:

determining a scope of the semantically aggregated index based on a custom user query.

8. The computer program product of claim 1, wherein the semantically aggregated index comprises a plurality of index shards, wherein the computer program product, when executed on the computer, causes the computer to perform additional operations, comprising:

processing each index shard in parallel across the processing nodes.

9. An indexer-agnostic index building system, comprising:

a plurality of processing nodes connected to a computer readable storage medium; and a processor configured to perform operations, the operations comprising:

extracting documents from the data source and storing the documents on the computer readable storage medium, wherein each document includes at least one data object;

distributing the documents to the processing nodes, wherein distributing the documents to the processing nodes comprises distributing the documents to a mapper at each processing node;

for each of the processing nodes, creating a shard fragment by indexing the data objects for each document into fields using semantic rules for identifying related data objects between the documents; and grouping indexed data objects for related fields by:

grouping related documents into one of a plurality of logical groups based on the semantic rules; and creating a full searchable index by:

consolidating shard fragments from the plurality of processing nodes into index shards for each of the plurality of logical groups; and combining the index shards into the full searchable index shard.

10. The system of claim 9, wherein a distribution load of the documents is generally balanced among the processing nodes after distributing the documents.

11. The system of claim 9, wherein the data objects comprise a full text of each document.

12. The system of claim 9, wherein the semantic rules comprise a rule based on at least one of the group consisting of: country of origin, language, topic, and metadata for the data objects in the document.

13. The system of claim 9, wherein each processing node contributes a portion of the index shard.

14. The system of claim 9, wherein the operations are implemented using distributed computing software, wherein distributing the documents to a plurality of nodes comprises distributing the documents to a mapper at each processing node, and grouping the indexed data objects comprises grouping the data objects at a reducer for each index shard created by the system.

* * * * *